United States Patent [19]

Hunter

[11] Patent Number: 4,764,232
[45] Date of Patent: Aug. 16, 1988

[54] METHOD OF PROTECTING A CABLE SPLICE WITH A SPLICE CLOSURE HAVING PRESSURE MEASURING MEANS

[75] Inventor: Thomas A. Hunter, Cary, N.C.
[73] Assignee: Raychem Corporation, Menlo Park, Calif.
[21] Appl. No.: 912,441
[22] Filed: Sep. 26, 1986
[51] Int. Cl.$^4$ .................. H02G 1/14; H02G 15/18
[52] U.S. Cl. ........................... 156/48; 156/49; 156/64; 174/10; 174/11 R; 174/76; 174/84 R
[58] Field of Search .............. 174/10, 11 R, 21 R, 174/22 R, 23 R, 76, 84 R, 88 R, 92; 156/48, 49

[56] References Cited

U.S. PATENT DOCUMENTS

| | | | |
|---|---|---|---|
| 3,865,967 | 2/1975 | Pritchett | 174/11 R |
| 3,895,180 | 7/1975 | Plummer | 174/22 R X |
| 4,025,717 | 5/1977 | Whittingham | 174/76 X |
| 4,466,843 | 8/1984 | Shimirak | 174/76 X |
| 4,648,919 | 3/1987 | Diaz et al. | 174/88 R X |
| 4,670,069 | 6/1987 | Debbaut et al. | 174/92 X |

FOREIGN PATENT DOCUMENTS

86/00178  1/1986  PCT Int'l Appl. ............. 174/76

Primary Examiner—Laramie E. Askin
Attorney, Agent, or Firm—Herbert G. Burkard

[57] ABSTRACT

A closure and method for protecting a splice connecting at least two cables. The closure includes a flexible reservoir positioned around the splice, a curable liquid sealant introduced into the reservoir, a means applied to the reservoir for increasing the pressure therein and a pressure measuring tube communicating between the inside and outside of the reservoir.

3 Claims, 3 Drawing Sheets

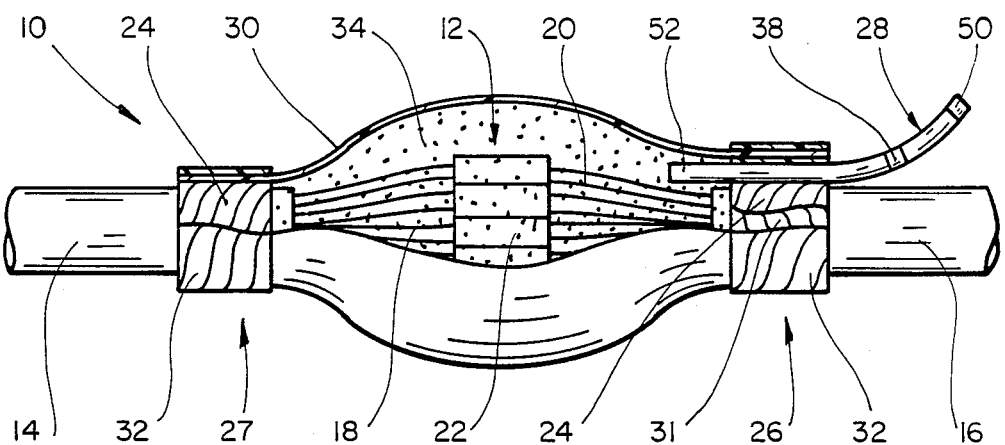
FIG_1
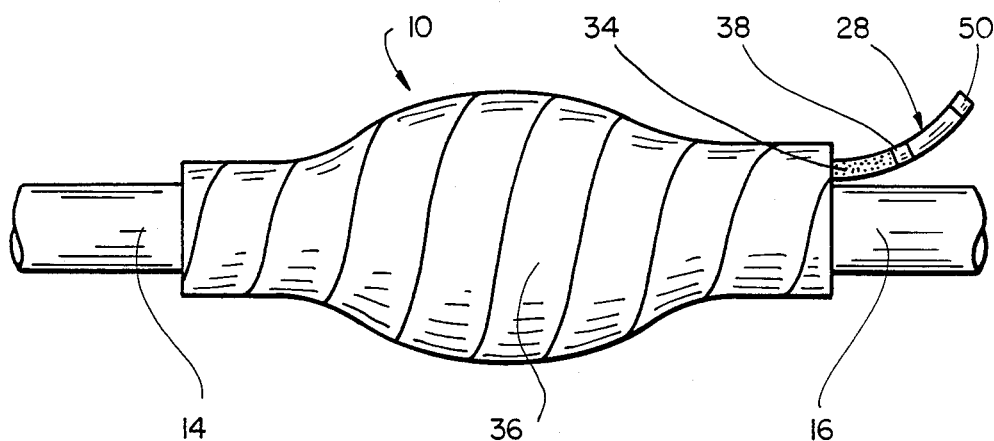
FIG_2

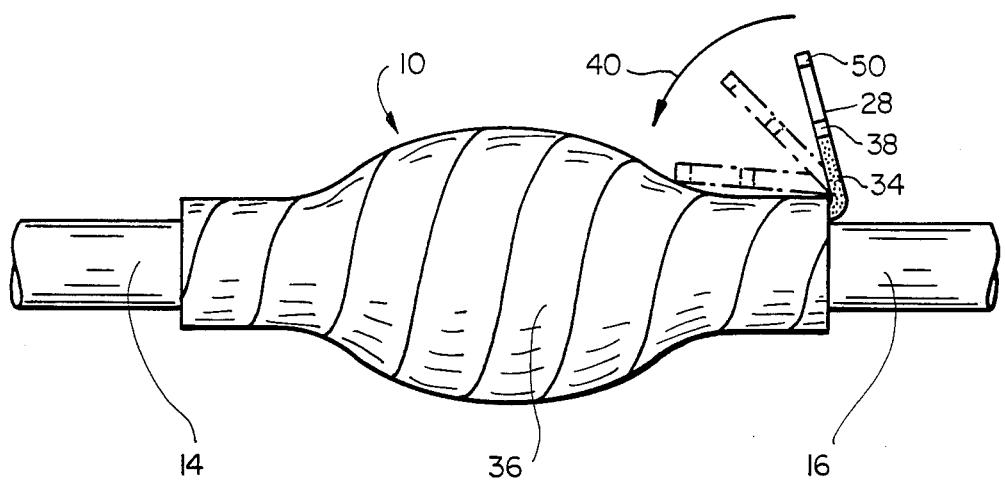
FIG_3
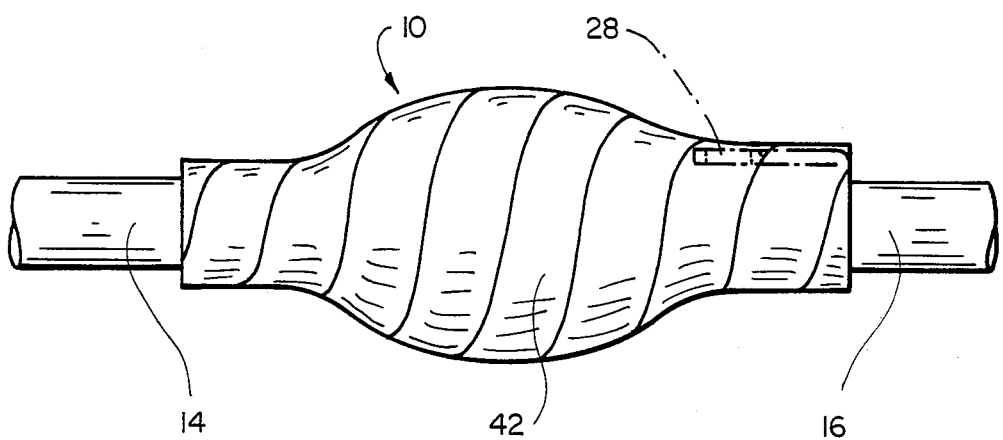
FIG_4

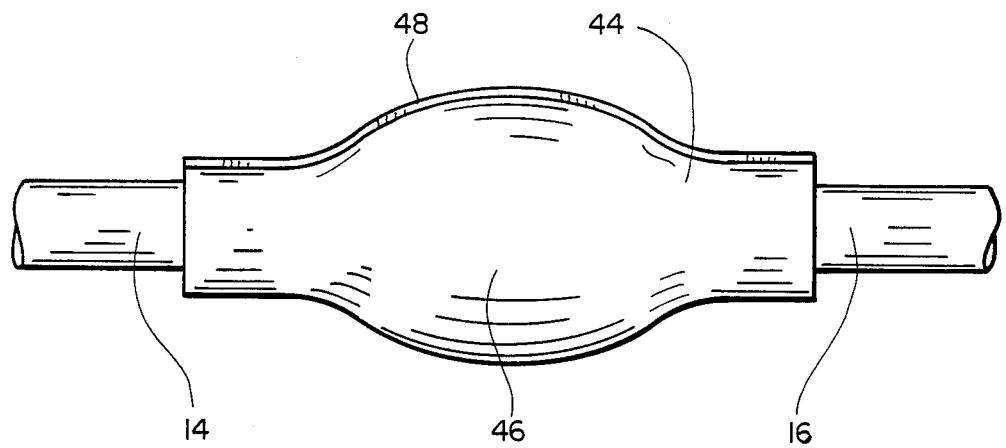
FIG_5
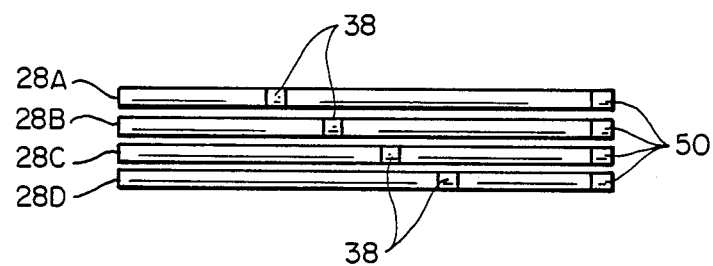
FIG_6
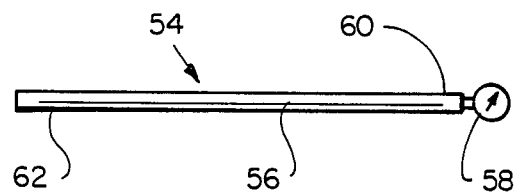
FIG_7

4,764,232

METHOD OF PROTECTING A CABLE SPLICE WITH A SPLICE CLOSURE HAVING PRESSURE MEASURING MEANS

BACKGROUND OF THE INVENTION

This invention relates to a method of protecting a splice in multi-wire electrical cables, in particular communications cables, from ingress of water into the splice.

As disclosed in, for example, Shimirak U.S. Pat. No. 4,466,843, which is incorporated by reference herein, various methods have been proposed for protecting a splice from ingress of water into the splice. Typically, these methods may comprise filling a reservoir surrounding the splice with a curable liquid sealant. In the Shimirak patent, there is provided the further step of compressing the reservoir while the liquid sealant is in the liquid state and maintaining it under compression for a time sufficient to permit cure of the liquid sealant to its hardened state.

As further disclosed in the Shimirak patent, it is desirable to compress the reservoir until a predetermined level of pressure is reached, generally on the order of about 3 to 12 pounds per square inch. More recently, however, it has been found that this predetermined level of pressure should be on the order of about 8 to 25 pounds per square inch. It would, of course, be desirable to know when this predetermined level of pressure had been reached. One method to ascertain this predetermined level of pressure is to insert a transducer within the reservoir. The pressure within the reservoir may be simply determined by monitoring the transducer. This method is satisfactory except that transducers are expensive and various electronics are needed to electrically monitor the transducer.

The need has thus arisen for a low cost, relatively simple way to measure the pressure within the reservoir.

Accordingly, it is an object of the invention to provide a method of protecting a splice which includes a low cost, relatively simple means for measuring the pressure within the reservoir.

This and other objects of the invention will become more apparent after referring to the following description considered in conjunction with the accompanying drawings.

BRIEF SUMMARY OF THE INVENTION

One aspect of the invention relates to a method of protecting a splice connecting at least two cables wherein each of the cables has a plurality of individual insulated wire conductors. The method comprises positioning a flexible reservoir around a splice, introducing a curable liquid sealant into the reservoir, applying to the reservoir a means for increasing the pressure therein, and inserting a pressure measuring tube into the reservoir so as to communicate between the inside and outside of the reservoir.

As will become apparent hereafter, the pressure measuring tube provides a low cost and relatively simple way to measure the pressure in the reservoir.

BRIEF DESCRIPTION OF THE DRAWINGS

FIG. 1 is a breakaway side view of a closure used in the method according to the invention.

FIGS. 2-5 are side views of a closure used in the method according to the invention.

FIG. 6 is a side view of a plurality of pressure measuring tubes according to the invention.

FIG. 7 is a side view of another embodiment of a pressure measuring tube according to the invention.

DETAILED DESCRIPTION OF THE INVENTION

Referring to the figures in more detail and particularly referring to FIG. 1 there is shown the closure 10 used in the method according to the invention. The closure 10 protects a splice generally denoted by 12 between at least two cables, two of which 14, 16 are shown in FIG. 1. Each of the cables 14, 16 has a plurality of individual insulated wire conductors 18, 20, respectively. The wire conductors 18, 20 are joined by modular connectors 22. In forming the closure, sealant tape 24 is first wrapped around each of the cables. It is preferred that this sealant tape 24 be S1061 (or equivalent) available from Raychem Corporation. This sealant tape is preferred since it provides a good seal by virtue of its desirable mastic properties. At one end 26 of the closure 10 hollow pressure measuring tube 28 is placed upon the sealant tape 24. Preferably, another layer of sealant tape 31 is then wrapped around the pressure measuring tube 28 and cable 16. Due to the desirable properties of the sealant tape 24,31, the pressure measuring tube 28 is embedded within the sealant tape 24,31 so that a complete seal around the pressure measuring tube 28 is obtained. Thereafter, a flexible reservoir 30 is positioned around the splice 12. At the end 26 of the closure 12 where the pressure measuring tube 28 is located, the flexible reservoir 30 is positioned over sealant tape 31 and pressure measuring tube 28. At the other end 27 of the closure 12, the flexible reservoir 30 is simply positioned over sealant tape 24. Then a wrapping 32 of vinyl tape is provided over the flexible reservoir 30 and cables 14,16. At this point in the procedure a complete seal is formed with the flexible reservoir 30 and pressure measuring tube 28 so that when the curable liquid sealant 34 is introduced into the reservoir 30, none of the liquid sealant 34 will seep out along the cables 14, 16. After introduction of the liquid sealant 34, the central open portion of the reservoir may be folded over and closed.

Since a considerable amount of compressive stress is to be applied to the pressure measuring tube 28, it is necessary that the pressure measuring tube be made from a relatively rigid material which will not collapse under the compressive stress and will not expand when its internal pressure increases. While many materials are suitable for this purpose, as will be apparent to one skilled in the art, a particularly preferred material for the pressure measuring tube is Nylon 6. Other preferred materials are Nylon 11 and Nylon 12 although they are not as desirable as Nylon 6 as they are more expensive. Polyethylene could also be used but it is not preferred since it is not as chemically compatible with the liquid sealant as are the Nylons.

The curable liquid sealant 34 which has been introduced into the reservoir, as shown in FIG. 1, is not yet under pressure. This being the case, the pressure measuring tube which communicates between the inside and outside of the reservoir 30 is substantially devoid of the curable liquid sealant 34.

Referring now to FIG. 2, a compression wrapping of tape 36 has been applied to the closure 10. This compression wrapping of tape 36 actually comprises a plurality of layers of tape which serve to increase the pressure within the reservoir 30. The preferred tape is a plasticized vinyl tape such as PERMAWRAP (available from Teltronics, Austin, Tex.) which is well known to those skilled in the art. While the tape wrapping is the preferred means for increasing the pressure within the reservoir 30, other means for increasing the pressure within reservoir 30, such as bladders, are contemplated within the scope of the invention. Due to the compression wrapping of the tape 36, the curable liquid sealant 34 has begun to move up the pressure measuring tube. While applying a few (usually about 4) layers of tape will increase the pressure within the reservoir 30, it is necessary to further apply at least one more layer of tape to increase the pressure within the reservoir to the desired predetermined level as measured by indicating means on the pressure measuring tube 28. All together the number of compression layers of tapes will be usually about 5 but may be more and could be less, depending upon the desired predetermined level of pressure. As shown in FIG. 2, the pressure within the reservoir 30 has reached the desired predetermined level as noted by indicating means 38 on the pressure measuring tube 28.

Once the predetermined level of pressure in the reservoir 30 has been reached, it is desirable to seal and then move the pressure measuring tube 28 out of the way so that the closure 10 may be finished off. In this regard the pressure measuring tube 28 may be folded over onto the closure 10 as shown in FIG. 3, in the direction of arrow 40. When the pressure measuring tube 28 is thus folded over, the tube will be crimped (and accordingly sealed) so that none of the liquid sealant 34 will leak out from the pressure measuring tube 28. It is thus apparent that the pressure measuring tube 28 must be flexible enough to create a pressure tight fold seal. Due to the sealing of the pressure measuring tube 28, the sealant 34 will remain at its predetermined level in the pressure measuring tube 28 no matter what the internal pressure of the reservoir 30. Curing of the liquid sealant 34 allows the sealant 34 to permanently remain at its predetermined level even if the pressure measuring tube 28 should be punctured or unsealed at some later time. This has a distinct advantage in that if the closure 10 should ever fail, the workman need only view the folded-over pressure measuring tube 28 to determine whether the correct pressure in the reservoir 30 had in fact been reached during installation.

It is particularly desirable that the reservoir 30 be maintained under pressure for a sufficient period of time so as to permit the liquid sealant 34 to cure. While this will not affect the sealant 34 in the pressure measuring tube 28, since it already has been crimped off from the main supply of sealant, it is nevertheless necessary to maintain the pressure so as to ensure that the splice is sufficiently encapsulated.

Referring now to FIG. 4 at least one more layer 42 of holding tape is applied over the pressure measuring tube 28 so as to secure the pressure measuring tube to the reservoir 30 and closure 10.

Finally, a closure body 44 is placed around the reservoir 30 and the pressure measuring tube 28 as shown in FIG. 5. The closure body may be any commercially available or well known closure body. As shown in FIG. 5 the preferred closure body is a heat recoverable body 46 of the wraparound type which is sealed by a rail and channel closure 48.

As should be apparent by now, the pressure measuring tube 28 according to the invention is a simple manometer. This manometer or pressure measuring tube 28 may take any of several forms. In one particular embodiment as shown in FIGS. 1 to 3, an end 50 of the pressure measuring tube 28 external to the reservoir 30 is sealed. Referring to, for example, FIG. 1, end 50 of the pressure measuring tube 28 is sealed while the other end 52 is opened to the pressure of the reservoir 30. Thus, the pressure of the reservoir 30 is able to be transmitted to the pressure measuring tube 28 in a way that is directly indicative of the pressure within the reservoir 30. While the pressure in the pressure measuring tube may not be linearly related to the pressure within the reservoir, for example due to the presence of air within the tube, the pressure can nevertheless be calculated using known scientific principles.

It is most preferred that the pressure measuring tube 28 has means for indicating the pressure within the reservoir 30. This indicating means may be of many forms as will be apparent to those skilled in the art. As shown in FIGS. 1 to 3, the indicating means may be indicia 38 on the pressure measuring tube 28 itself.

Referring now to FIG. 6 there is illustrated four different pressure measuring tubes 28A, 28B, 28C, 28D. One end 50 of each of the pressure measuring tubes 28A to 28D, that is the end that will be external to the reservoir 30, is sealed. As can be seen, the indicia 38 on the pressure measuring tubes 28A to 28D progressively move toward the sealed end 50 of each of the pressure measuring tubes. The indicia 38 represent a certain predetermined level of pressure. As the indicia 38 move towards the sealed end 50 of the tubes, the predetermined level of pressure is correspondingly increased. For example, the lowest level of predetermined pressure for the pressure measuring tubes shown in FIG. 6 occurs with respect to tube 28A. This pressure measuring tube 28A would ordinarily be used for the larger closures. It is expected that the indicia 38 on pressure measuring tube 28A would correspond to a pressure of about 8 pounds per square inch. On the other hand, the highest level of predetermined pressure would occur with respect to tube 28D which would ordinarily be used for the smaller closures. It is expected that the indicia 38 on pressure measuring tube 28D would correspond to a pressure of about 25 pounds per square inch. The other pressure monitoring tubes, 28B and 28C, in FIG. 6 correspond to predetermined pressure levels between about 8 and 25 pounds per square inch. Of course, the predetermined level of pressure will be predetermined according to the closure size and the desired level of pressure. Thus, the fact that the pressure measuring tubes shown in FIG. 6 are particularly suited for pressures between 8 and 25 pounds per square inch is only for purposes of illustration and not of limitation.

The indicia 38 in FIGS. 1 to 6 may be represented by a set of two parallel lines or a band of color so as to give a small range of predetermined levels of pressure for each pressure measuring tube. Alternatively, the indicia 38 may be represented by graduations on the pressure measuring tube. Other variations of indicia will occur to those skilled in the art. These other indicia are, nevertheless, contemplated within the scope of the invention.

Another embodiment of the pressure measuring tube is shown in FIG. 7. This pressure measuring tube 54 consists of a hollow tubular piece of material 56 with a pressure gauge 58 at one end 60. The pressure gauge 58 would be at the end of the pressure measuring tube 54 which is external to the reservoir 30. Again, the open end 62 of the tube 54 would be in contact with the inside of the reservoir 30. Accordingly, once a compression wrapping of tape is applied to the closure 10, the pressure within the reservoir 30 would be directly indicated on the pressure gauge 58. The further operation of the pressure measuring tube 54 would be identical to pressure measuring tubes 28 discussed previously in that once the desired level of pressure is reached, the tube 54 may be folded over, as shown in FIG. 3, so as to maintain a permanent record of the pressure level which was actually reached during installation. Once the pressure measuring tube 54 is folded over, the pressure gauge 58 may be removed and the end 60 of the tube 54 sealed. Curing of the liquid sealant may occur before or after the removal of the pressure gauge.

An additional requirement of the pressure measuring tube material is that it should be transparent or translucent so that the curable liquid sealant can be observed and then compared with the indicia (if present). The dimensions of the tube are particularly important. The inside diameter of the tube is limited by the viscosity and surface tension of the encapsulant. For example, if the inside diameter is too large, the encapsulant merely flows in without regard to the pressure within the reservoir. Thus, the inside diameter of the tube is preferably between about ⅛ inch and ¼ inch.

The length of the pressure measuring tube is dictated more by practical reasons. If the tube is too short, the indicia are hidden within the closure, while if the tube is too long, the tube gets in the way during assembly of the closure. Accordingly, the preferred length of the pressure measuring tube is generally between about 10 and 20 inches.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

I claim:

1. A method of protecting a cable splice, which comprises:
    (a) providing a cable splice between two cables;
    (b) wrapping a tape around each cable at a position adjacent the splice to form first and second tape wraps;
    (c) placing a pressure measuring tube across the first tape wrap such that it has one end adjacent the splice and an opposite end further away from the splice than said first tape wrap;
        said pressuring measuring tube being sealed at said opposite end, and having a transparent or translucent wall;
    (d) positioning a flexible reservoir around the splice and around the first and second tape wraps and around the pressure measuring tube such that said one end of the tube lies within the reservoir and said opposite end lies outside the reservoir;
    (e) then introducing a curable sealant into the reservoir via an opening therein;
    (f) then closing the opening to seal the reservoir;
    (g) then compression wrapping a tape around the reservoir thereby subjecting the curable sealant to compression;
    (h) observing through the wall of the pressure measuring tube the extent to which curable sealant is displaced into the tube and thereby the pressure to which the sealant is subjected;
    (i) then curing the curable sealant while the sealant is thus observable.

2. A method as claimed in claim 1, which includes the step of folding the pressure measuring tube onto the reservoir after the sealant has cured.

3. A method as claimed in claim 2, which additionally comprises wrapping a holding tape around the reservoir and the tube after folding the tube such that the tube is held against the reservoir by means of the holding tape.

* * * * *